United States Patent
Molina et al.

(10) Patent No.: US 10,097,134 B2
(45) Date of Patent: Oct. 9, 2018

(54) PILE CAP WITH INTEGRATED BEARING HOUSING

(71) Applicant: SolarCity Corporation, San Mateo, CA (US)

(72) Inventors: David Molina, Oakland, CA (US); Charles Almy, Berkeley, CA (US); Soren Jensen, Corte Madera, CA (US); Kathryn Austin Pesce, San Francisco, CA (US); Johann Fritz Karkheck, Petaluma, CA (US)

(73) Assignee: SolarCity Corporation, San Mateo, CA (US)

( * ) Notice: Subject to any disclaimer, the term of this patent is extended or adjusted under 35 U.S.C. 154(b) by 0 days.

(21) Appl. No.: 15/175,591

(22) Filed: Jun. 7, 2016

(65) Prior Publication Data
US 2017/0229998 A1   Aug. 10, 2017

Related U.S. Application Data

(60) Provisional application No. 62/292,162, filed on Feb. 5, 2016.

(51) Int. Cl.
*H02S 20/32* (2014.01)
*E02D 5/22* (2006.01)

(52) U.S. Cl.
CPC .............. *H02S 20/32* (2014.12); *E02D 5/223* (2013.01); *E02D 2600/20* (2013.01); *E02D 2600/30* (2013.01)

(58) Field of Classification Search
None
See application file for complete search history.

(56) References Cited

U.S. PATENT DOCUMENTS

| D744,417 S | * | 12/2015 | Au | D13/102 |
|---|---|---|---|---|
| D777,098 S | * | 1/2017 | Au | D13/102 |
| 2005/0085819 A1 | * | 4/2005 | Ellis | A61B 17/8076 606/71 |
| 2005/0241104 A1 | * | 11/2005 | Grande | E05F 1/1091 16/49 |
| 2009/0265895 A1 | * | 10/2009 | Box | F16L 3/12 24/20 R |
| 2011/0253195 A1 | * | 10/2011 | Kim | F24J 2/541 136/246 |
| 2011/0289750 A1 | * | 12/2011 | Kats | F24J 2/5424 29/428 |
| 2012/0180845 A1 | * | 7/2012 | Cole | F24J 2/541 136/246 |

(Continued)

*Primary Examiner* — Ryan D Kwiecinski
*Assistant Examiner* — Kyle J. Walraed-Sullivan
(74) *Attorney, Agent, or Firm* — Kilpatrick Townsend & Stockton LLP

(57) ABSTRACT

This disclosure relates to the design of pile cap assemblies configured to rotatably couple the torque tube of a photovoltaic solar tracker to multiple support piles that elevate the torque tube above the ground. The pile cap assemblies define low friction bearings that allow the torque tube to rotate smoothly within the low friction bearings. The pile cap assemblies also include numerous mounting hole configurations that allow for adjustment of a position of the pile cap assemblies with respect to the support piles. This allows for any small variation in positioning of the support piles to be accommodated.

18 Claims, 15 Drawing Sheets

(56) References Cited

U.S. PATENT DOCUMENTS

| | | | |
|---|---|---|---|
| 2012/0216852 A1* | 8/2012 | Almy | F24J 2/38 136/246 |
| 2013/0039610 A1* | 2/2013 | Schneider | F24J 2/541 384/428 |
| 2013/0160816 A1* | 6/2013 | Barton | H02S 20/00 136/246 |
| 2014/0069416 A1* | 3/2014 | von Behrens | F24J 2/42 126/694 |
| 2014/0182654 A1* | 7/2014 | Agullo | F16C 35/02 136/246 |
| 2014/0216522 A1* | 8/2014 | Au | H01L 31/0522 136/246 |
| 2014/0261626 A1* | 9/2014 | Ripoll Agullo | H02S 20/00 136/246 |
| 2015/0001356 A1* | 1/2015 | Au | H02S 20/32 248/185.1 |
| 2015/0059826 A1* | 3/2015 | Reed | F24J 2/5264 136/246 |
| 2015/0090316 A1* | 4/2015 | Song | F24J 2/38 136/246 |
| 2015/0107580 A1* | 4/2015 | Weber | F16C 13/006 126/600 |
| 2015/0207452 A1* | 7/2015 | Werner | F24J 2/16 136/246 |
| 2016/0218663 A1* | 7/2016 | Werner | H02S 20/10 |
| 2016/0377325 A1* | 12/2016 | Au | F24J 2/523 126/606 |
| 2017/0195761 A1* | 7/2017 | Lippitt | H04R 1/026 |

* cited by examiner

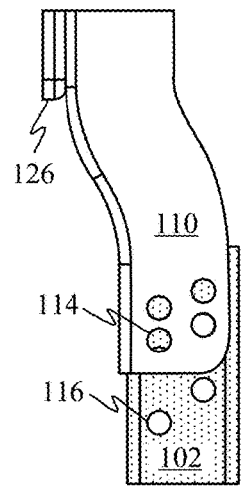 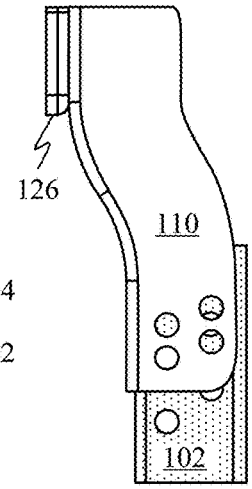 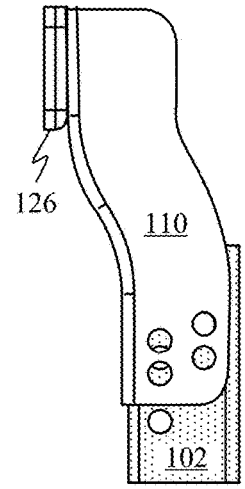
FIG. 3A            FIG. 3B            FIG. 3C
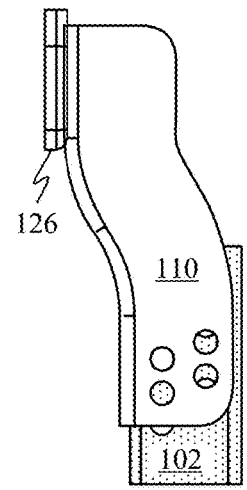 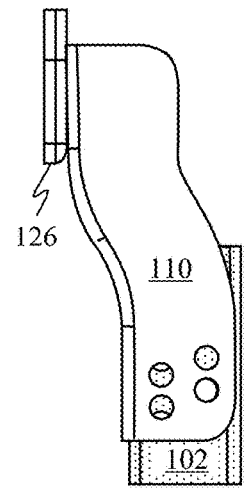 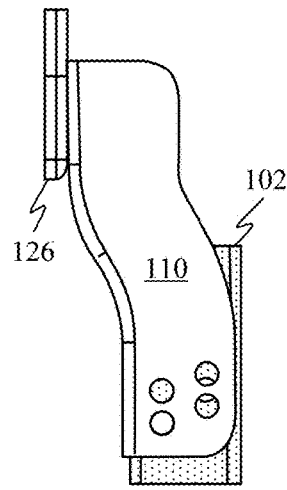
FIG. 3D            FIG. 3E            FIG. 3F

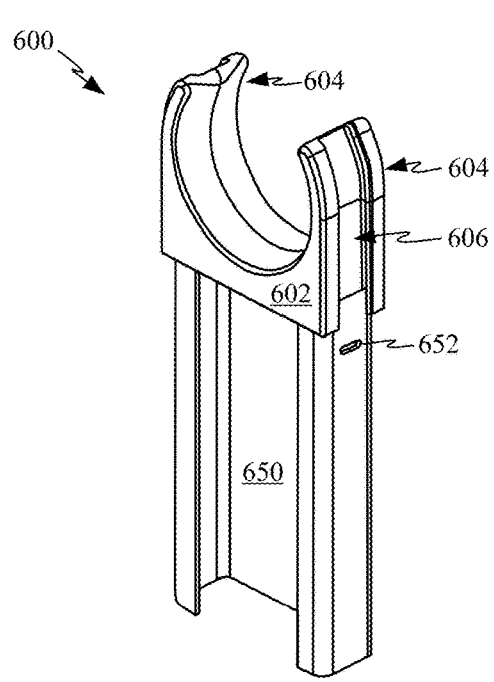
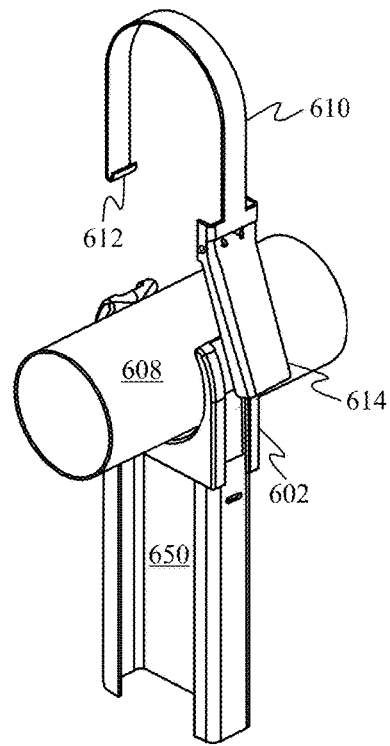
*FIG. 6A*  *FIG. 6B*
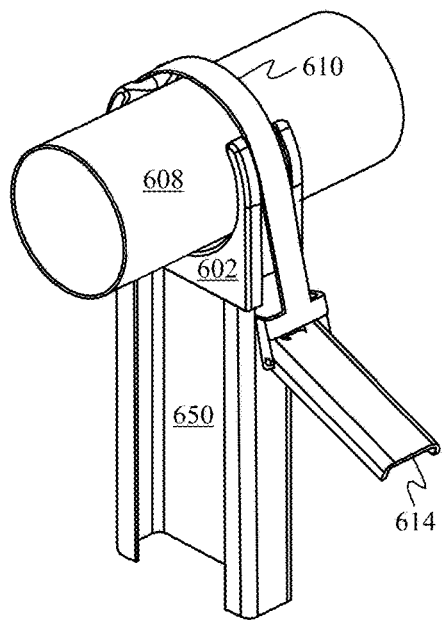
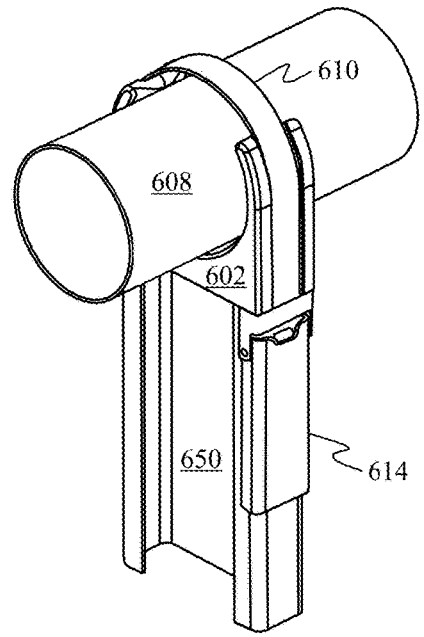
*FIG. 6C*  *FIG. 6D*

PILE CAP WITH INTEGRATED BEARING HOUSING

CROSS-REFERENCES TO RELATED APPLICATIONS

This application claims priority to U.S. Provisional Application No. 62/292,162, filed Feb. 5, 2016 entitled "PILE CAP WITH INTEGRATED BEARING HOUSING", the disclosure of which is incorporated by reference herein in its entirety and for all purposes.

FIELD

The described embodiments relate generally to bearings for supporting a torque tube of a sun-tracking solar array. More particularly, the present embodiments are directed to ways in which the bearing can be mounted to a supporting pile.

BACKGROUND

Photovoltaic solar trackers typically consist of one or more interconnected sections of torque tube that are elevated above the ground and oriented along a North-South axis by supports. One or more rows of photovoltaic modules are then attached to the interconnected sections of torque tube. A motor and drive assembly is used to rotate the torque tube so that the modules face East at sun up and to rotate back, Westward throughout the course of each day, approximately tracking the sun as it moves across the sky.

Early trackers—circa mid 2000's—were functional but very expensive. This was due in part to the overly complicated mechanical drive mechanisms and the fact that they had not been optimized for cost or to minimize materials. Every component that was unnecessarily, large, and expensive, created a ripple effect that required the other components to be equally robust to handle the weight and forces created by that component, which added to the cost and adversely affected reliability. These shortcomings, combined with the relatively high price of photovoltaics at that time, made the incremental cost of adding tracking unattainable. As a result, their use was fairly uncommon, other than in the largest arrays (e.g., multiple Megawatts).

Now that the price of photovoltaic modules has fallen dramatically to well below $1 per watt, there is renewed interest in solar trackers, even for smaller arrays (e.g., <1 megawatt). However, to compete fully with fossil fuel-based energy, it is critical that the cost for other system components, such as tracking systems also comes down. Therefore, there is a need for solar trackers that perform well and are optimized for cost, low weight, ease of installation and material usage.

SUMMARY

This disclosure describes various embodiments that relate to methods and apparatus for securing a torque tube to a support pile. Generally, the support pile can be any support member used to elevate the torque tube above the ground so that solar modules coupled to the torque tube can rotate through a desired angle of rotation.

A solar tracking array is disclosed and includes the following: a support pile defining a first array of mounting holes proximate a distal end of the support pile, the first array of mounting holes being spaced apart at a first interval; a torque tube coupled with a number of photovoltaic modules; a pile cap assembly defining both a bearing within which a section of the torque tube is positioned and a second array of mounting holes spaced apart along the pile cap assembly at a second interval different than the first interval; and a fastener extending through one of the first array of mounting holes and through one of the second array of mounting holes to couple the pile cap assembly to the support pile.

In some embodiments, only two mounting holes of the first array of mounting holes are aligned with any of the second array of mounting holes at any given lateral orientation between the first and second arrays of mounting holes In some embodiments, the pile cap assembly includes a bearing housing and a locking mechanism.

In some embodiments, the locking mechanism includes an upper bearing and a metal strap routed through the upper bearing.

In some embodiments, the upper bearing includes a curved polymeric bearing defining a channel through which the metal strap is routed.

In some embodiments, the bearing housing includes a lower bearing that cooperates with the upper bearing to define the bearing.

In some embodiments, the pile cap assembly includes a bearing housing that defines retaining hooks that engage the distal end of the support pile.

In some embodiments, the retaining hooks are configured to allow the bearing housing to slide laterally with respect to the distal end of the support pile when the fastener is removed from the mounting holes.

In some embodiments, the retaining hooks engage a linear edge of the support pile.

In some embodiments, the bearing housing is formed from sheet metal.

A pile cap assembly for supporting a torque tube of a solar tracking array is disclosed. The pile cap assembly includes the following: a bracket portion for connecting the pile cap assembly to a support pile. The bracket portion has an integrated lateral adjustment mechanism and at least one retaining hook. The pile cap assembly also includes a bearing portion, attached to or integrated with the bracket portion, the bearing portion subtending a portion of an arc and defining an opening dimensioned to receive a section of torque tube. The pile cap assembly also includes a locking mechanism that closes the arc around the section of torque tube. The locking mechanism includes a latch portion for selectively coupling the locking mechanism to the bracket portion or to a support pile.

In some embodiments, the integrated lateral adjustment mechanism includes a plurality of mounting holes configured to couple with mounting holes defined by the support pile.

In some embodiments, the bearing portion includes a bearing housing and a lower bearing supported by the bearing housing, the bearing housing defining an anti-rotation feature that prevents rotation of the lower bearing with respect to the bearing housing.

In some embodiments, the lower bearing includes a disposable alignment feature extending from one end of the lower bearing to another end of the lower bearing.

In some embodiments, the disposable alignment feature is formed by the same injection molded process as the lower bearing and defines an aperture positioned in the central region of the opening that is configured to identify a center of the opening.

A support member of a solar tracking array is disclosed and includes the following: a support pile defining a first array of mounting holes spaced apart by a first interval; a pile cap assembly defining a second array of mounting holes spaced apart by a second interval different than the first interval, two or more of the first plurality of mounting holes being aligned with corresponding mounting holes of the second plurality of mounting holes; and fasteners coupling the support pile to the pile cap assembly by engaging the two or more of the first array of mounting holes.

In some embodiments, the first and second arrays of mounting holes are arranged linearly in a manner that orients the linear arrangements parallel with the ground when the support pile is secured to the ground.

In some embodiments, the pile cap assembly defines a bearing having a size and shape suitable for receiving a torque tube of the solar tracking array.

In some embodiments, the fasteners are rivets.

In some embodiments, the support pile has a C-shaped cross-sectional geometry.

BRIEF DESCRIPTION OF THE DRAWINGS

The disclosure will be readily understood by the following detailed description in conjunction with the accompanying drawings, wherein like reference numerals designate like structural elements, and in which:

FIGS. 3A-3F, show how openings defined by a pile cap bracket can align with mounting holes defined by a support pile in embodiments of the invention;

FIG. 6A shows another pile cap assembly attached to a support pile according to embodiments of the invention;

FIG. 6B shows a torque tube positioned within a lower bearing of the pile cap assembly depicted in FIG. 6A;

FIG. 6C shows a retaining hook engaged in an opening defined by a bearing housing of the pile cap assembly depicted in FIGS. 6A-6B;

FIG. 6D shows how as a latch engages an opening, a metal strap tightens against a torque tube to secure the torque tube within the bearing defined by the pile cap assembly according to embodiments of the invention;

DETAILED DESCRIPTION

Figure 1A:
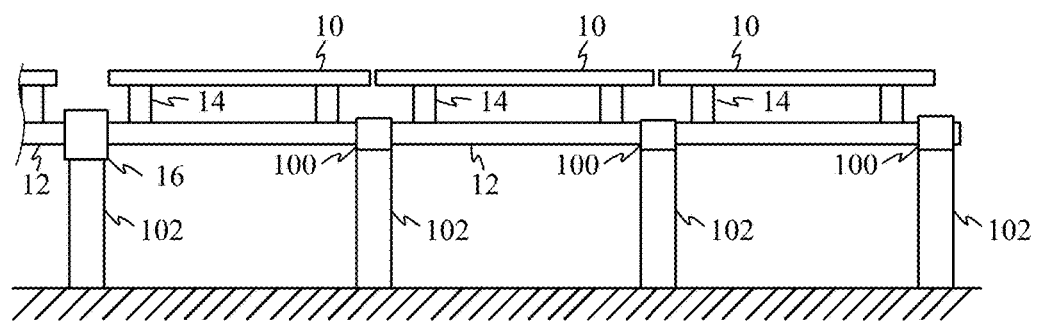
FIG. 1A shows an exemplary solar tracking system according to embodiments of the invention.

This description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the invention is not limited to the embodiments shown, but is to be accorded the widest scope consistent with the principles and features disclosed herein.

Solar tracking arrays often rely upon torque tubes to keep the photovoltaic modules making up the solar tracking arrays oriented towards the sun. Typically, one or more rows of photovoltaic modules are mounted to a torque tube that is oriented along a North-South axis. A motor coupled to the torque tube can then be configured to periodically rotate the torque tube throughout the day, which in turn rotates the photovoltaic modules at a rate that keeps the photovoltaic modules facing the sun. Many solar tracking arrays will include a large number of torque tubes to support a desired number of photovoltaic modules of a solar tracking array. The torque tubes are generally elevated above the ground by a number of support piles. Elevating the torque tubes above the ground allows the photovoltaic modules to be rotated over a large angle of rotation on account of the elevation of the torque tubes preventing contact between the photovoltaic modules and the ground. In some embodiments, the support piles can elevate the torque tube high enough to allow for the photovoltaic modules mounted to the torque tubes to be rotated over a range of about 180 degrees without contacting the ground (e.g. see FIG. 1A).

The weight of the torque tube and photovoltaic modules generally require the torque tube to be supported at various intervals along a length of the torque tube. To support the torque tube without restricting rotation, each of the support piles can include a pile cap assembly that includes a low friction bearing configured to minimize friction between the pile cap assembly and the torque tube during rotation of the torque tube. Unfortunately, any minor misalignment of the support piles also can cause the low-friction bearings of the pile cap assemblies to be misaligned, which can result in substantial binding between the torque tube and the misaligned bearings, thereby increasing wear on the motor associated with the torque tube and potentially preventing the torque tube from rotating at all.

One solution to this problem is to include a series of mounting holes in both the support pile and the pile cap assembly. The series of mounting holes allows the pile cap assemblies to be positioned in different locations with respect to the support piles so that any misalignment of the support piles can be accommodated by shifting the position of the pile cap assembly with respect to the support pile. To increase the flexibility achieved by the different mounting holes, an interval between the mounting holes in the support pile can be different than an interval between the mounting holes in the pile cap assembly. This can allow for an increased number of hole positions without adding a set of mounting holes for each position. In this way, the number of positions can be increased while limiting the number of mounting holes made in the pile cap assembly and the support pile. A reduced number of mounting holes can be beneficial, as larger numbers of mounting holes tend to reduce the strength of associated components.

A pile cap assembly can be further improved with an upper bearing that can be quickly secured atop a torque tube positioned within a bearing housing of the pile cap assembly. In some embodiments, the upper bearing can be coupled about the torque tube by securing a free end of the upper bearing to the bearing housing with a rivet or press-fit fastener. In some embodiments, the upper bearing can include a latching mechanism configured to allow the upper bearing to be secured to the bearing housing by hand.

The pile cap assembly can also benefit from a bearing that is sized to secure the torque tube bearing within the pile cap assembly without squeezing tightly around the torque tube. In some embodiments, this can be achieved by sizing the bearing defined by the pile cap assembly to have a slightly larger diameter around than the torque tube. This reduction in force applied by the bearing commensurately reduces the static and dynamic friction experience by the torque tube when rotating to keep the photovoltaic modules oriented towards the sun.

These and other embodiments are discussed below with reference to FIGS. 1A-8, however, those skilled in the art will readily appreciate that the detailed description given herein with respect to these figures is for explanatory purposes only and should not be construed as limiting.

FIG. 1A shows an exemplary solar tracking system. In particular, photovoltaic modules 10 are depicted being attached to torque tube 12 by coupling members 14. FIG. 1A also depicts how support piles 102 elevate torque tube 12 above the ground so that rotation of torque tube 12 doesn't result in interference between photovoltaic modules 10 and the ground. Solar tracking motor 16 is used to rotate torque tube 12 at a rate that keeps photovoltaic modules 10 oriented towards the sun. Finally, pile cap assemblies 100 are used to couple torque tube 12 with support piles 102. Each of pile cap assemblies 100 keep a portion of torque tube 12 positioned above a corresponding support pile 102 and restrict lateral motion of torque tube 12. In this way, pile cap assemblies 100 can keep torque tube 12 supported and aligned with an axis about which solar tracking motor 16 is configured to operate.

Figure 1B:
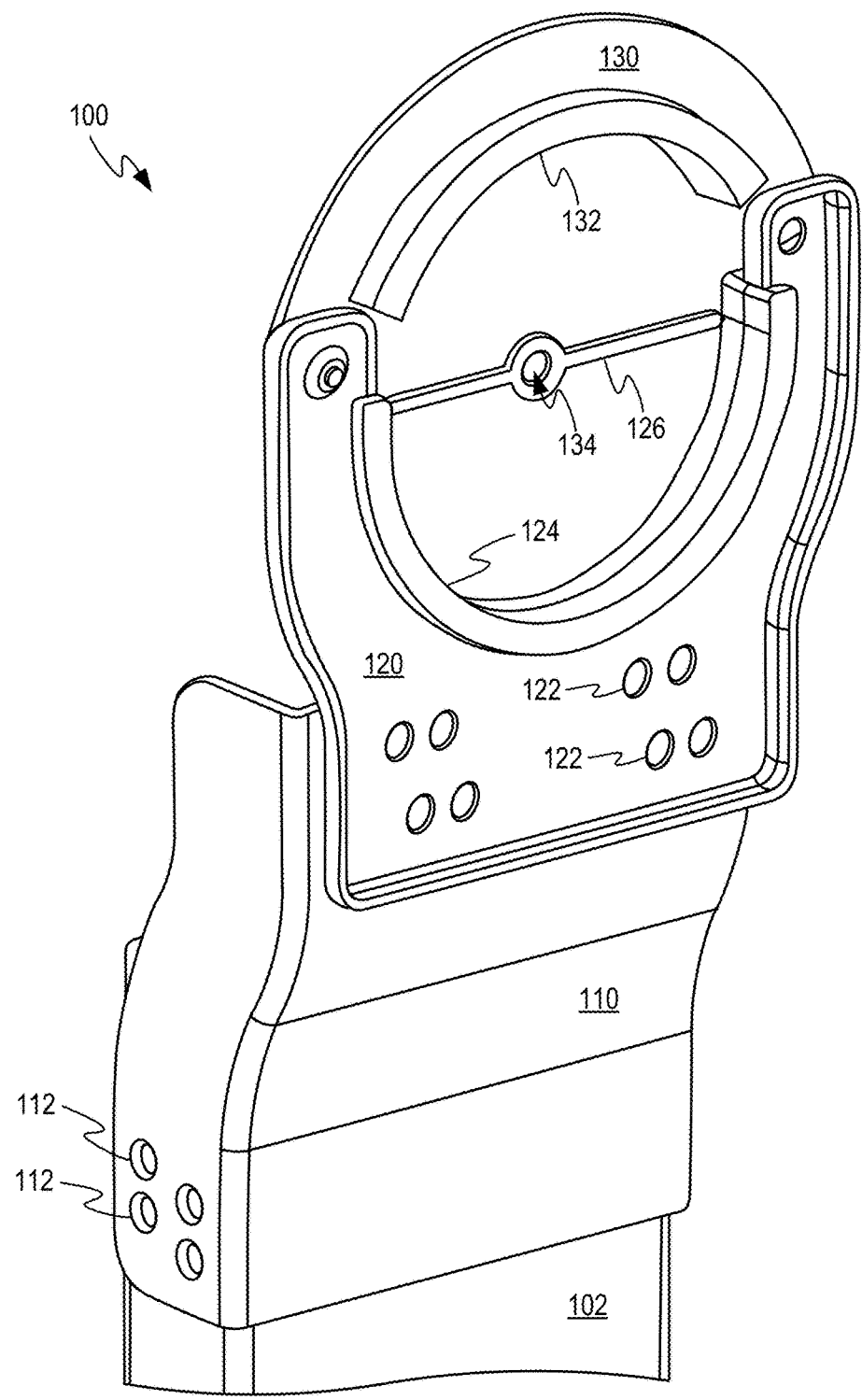
FIGS. 1B-1C show an exemplary pile cap assembly mounted to a support pile according to embodiments of the invention.
Figure 1C:
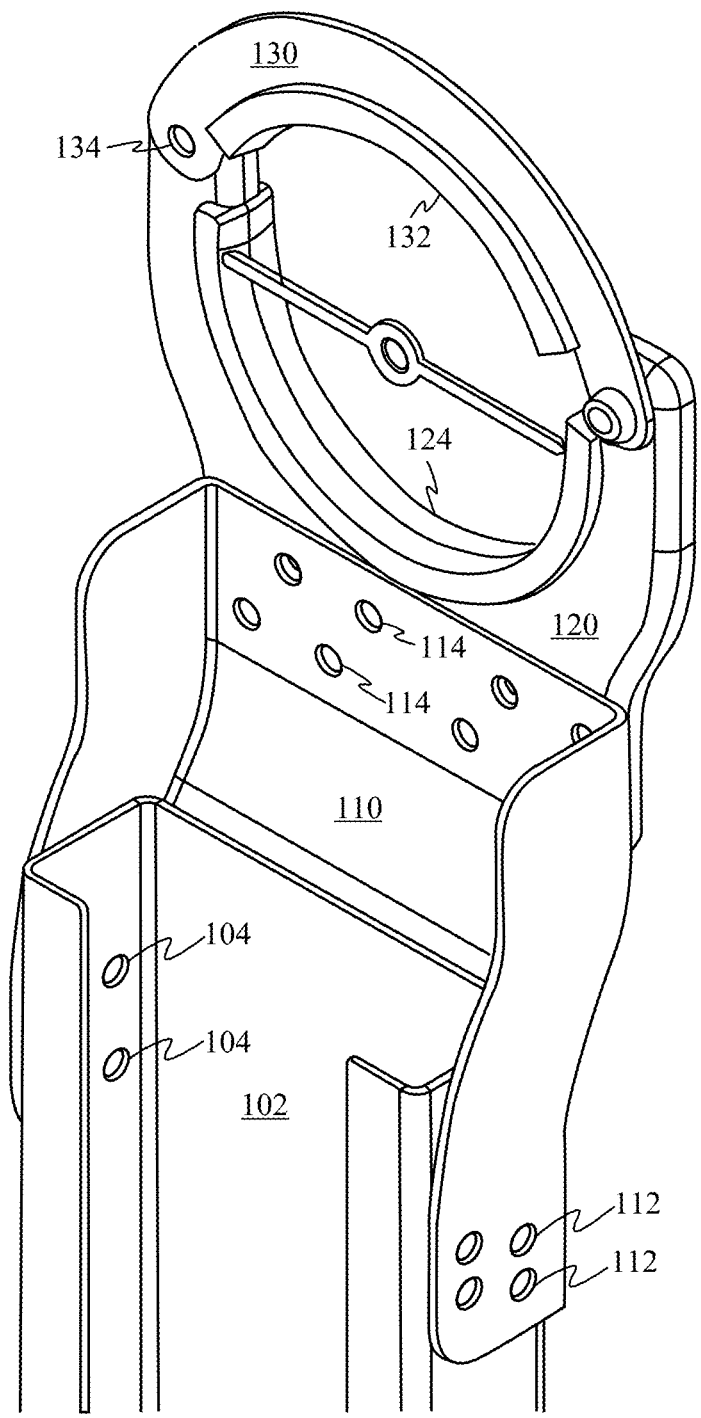

FIGS. 1B-1C show a perspective view of pile cap assembly 100 mounted to support pile 102 to form a support member for elevating a torque tube above the ground. As depicted pile cap assembly 100 includes pile cap bracket 110, bearing housing 120 and clamp 130. Each of these components can be formed of stamped sheet metal. Pile cap bracket 110 has a C-shaped cross section configured to fit around support pile 102, which in this example, is shown as a C-beam. It should be appreciated that support pile 102 may have a different cross-sectional profile, however, this particular profile can be relatively less expensive and lighter weight than other designs. FIG. 2B shows how pile cap bracket 110 can define a series of mounting holes 112 that align with holes 104 formed near the end of support pile 102. A fastener such as a nut and bolt, press-fit fastener or rivet can engage aligned mounting holes 112 and 104 to couple support pile 102 and pile cap bracket 110 together. A desired vertical or lateral position of support pile 102 with respect to pile cap assembly 100 can be achieved by choosing which mounting holes to use to fasten these structures together using a rivet, bolt or other secure fastener. In some embodiments, holes 112 are symmetrically offset from one another so that at least one mounting hole 112 will match up with one of mounting holes 104 defined by support pile 102. This will allow pile cap bracket 110 to be attached to support pile 102 at one of a number of different positions. It should be appreciated that different numbers and configurations of holes 112 and 104 can be used.

Bearing housing 120 mates with pile cap bracket 110 in a manner similar to the way in which pile cap bracket 110 mates with support pile 102. For example, multiple mounting holes 122 are defined by bearing housing 120 and multiple mounting holes 114 are defined by pile cap bracket 110. Mounting holes 122 and 114 allow for either vertical or lateral adjustment of bearing housing 120 with respect to pile cap bracket 110. Bearing housing 120 includes lower bearing 124, which sits in a cradle defined by bearing housing 120 and upper bearing 132 is secured to clamp 130. In some embodiments, lower bearing 124 and upper bearing 132 can be made out of plastic (e.g. Acetal, UHMWPE, Noryl or Polypropylene), but it should be appreciated that they may be made out of other suitable durable, corrosion-resistant, low friction materials.

In various embodiments, clamp 130 may be hinged to bearing housing 120 using a fastener such as a rivet or nut and bolt. In various embodiments, lower bearing 124 may include disposable alignment portion 126. In some embodiments, disposable alignment portion 126 can be integrally formed with lower bearing 124 when both lower bearing 124 and alignment portion 126 are formed in a single injection molding operation. Disposable alignment portion 126 defines a centerline opening 128 that allows a surveyor's laser to orient pile cap bracket 110 and bearing housing 120 with respect to other adjacent structures. Micro-adjustments can be made using the various mounting holes in pile cap bracket 110 and bearing housing 120 to align bearing housing 120 with an adjacent assembly or a fixed reference point. The connection between disposable alignment portion 126 and lower bearing 124 can be narrow so that disposable alignment portion 126 can be easily broken off and discarded after the aforementioned alignment process is complete.

In various embodiments, a torque tube (not depicted) will be set down on lower bearing 124, and then clamp 130 will be secured over the torque tube, positioning upper bearing 132 against or at least proximate the torque tube. In some embodiments, a gap can be left between upper bearing 132 and the torque tube to prevent friction between upper bearing 132 and the torque tube. A second rivet may be used to hold upper bearing 132 and clamp 130 in place. This will allow the torque tube to rotate within the bearing but prevent it from becoming dislodged from the bearing defined by upper and lower bearings 124 and 132. In addition to being very lightweight and fast to install, requiring only a riveting tool or other mechanical fastener, two piece assembly 100 according to the various embodiments of the invention places the load of the torque tube over the shear center of support pile 102, thereby improving its load capacity.

Figure 1D:
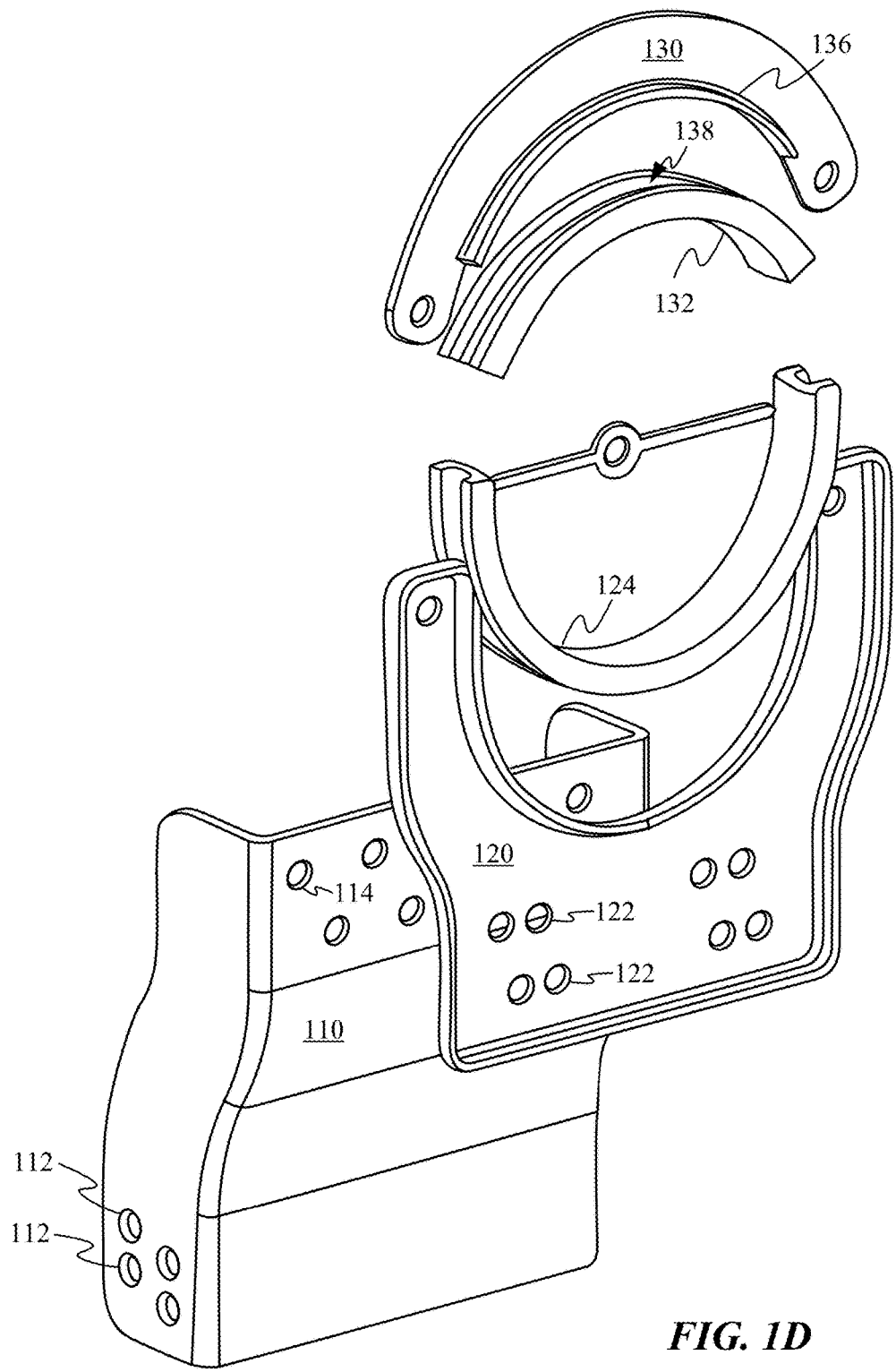
FIG. 1D shows an exploded view of the exemplary pile cap assembly depicted in FIGS. 1B-1C.

In addition to the features shown by FIGS. 1B and 1C, the exploded view shown by FIG. 1D of pile cap assembly 100 includes flange feature 136 of clamp 130 configured to fill and engage channel 138 defined by upper bearing 132. In some embodiments, the material making up upper bearing 132 can flex to receive flange feature 136 and then snap back into its original position to retain flange feature 136 of clamp 130 within channel 138. FIG. 1D also shows the geometry of the cradle portion of bearing housing 120 that receives lower bearing 124.

Figure 2A:
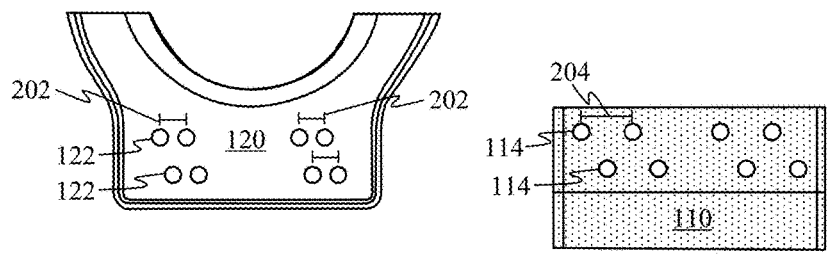
FIGS. 2A-2I show how mounting holes defined by a bearing housing can be arranged in different positions with respect to mounting holes in a pile cap bracket to shift the position of the bearing housing as desired in embodiments of the invention.
Figure 2B:
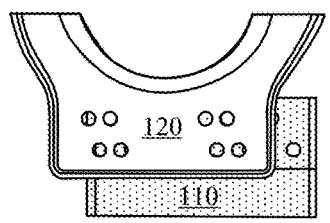
Figure 2C:
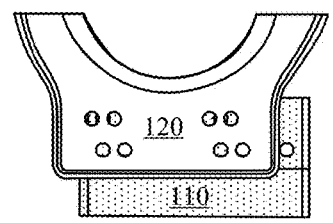
Figure 2D:
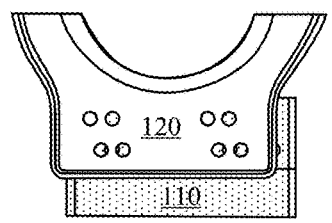
Figure 2E:
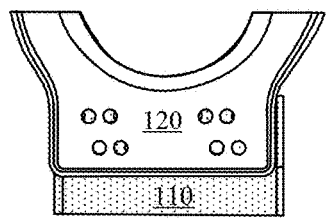
Figure 2F:
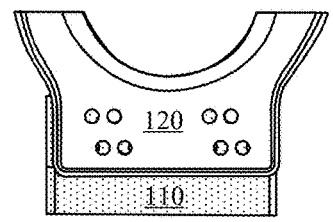
Figure 2G:
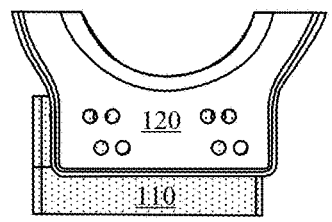
Figure 2H:
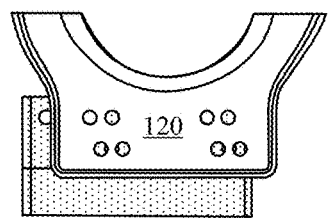
Figure 2I:
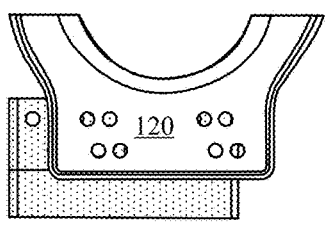

FIGS. 2A-2I show how mounting holes defined by bearing housing 120 can be arranged in different positions with respect to mounting holes in pile cap bracket 110 to shift the position of bearing housing 120 as desired. FIG. 2A shows a portion of both bearing housing 120 and pile cap bracket 110 separated from one another. Bearing housing 120 is depicted having a pattern of mounting holes 122 separated by an interval 202, while pile cap bracket 110 defines mounting holes 114 at interval 204, which is substantially greater than interval 202. In some embodiments, the interval between mounting holes 122 and 114 can allow bearing housing 120 to be shifted at intervals of about 7 mm, allowing for a total range of motion of 49 mm. In other embodiments, the interval between the mounting holes can allow the position to be shifted in increments of 7.5 mm for a total range of motion of 52 mm. It should be appreciated that many other permutations are possible and considered to be within the scope of this disclosure. The varied intervals between mounting holes 122 and 114 increase the number of positions possible between pile cap bracket 110 and bearing housing 120.

FIGS. 2B-2I illustrate eight possible horizontal positions compatible with the depicted mounting hole layouts for a given vertical position of bearing housing 120 with respect to pile cap bracket 110. It should be appreciated that bearing housing 120 can be shifted vertically with respect to pile cap bracket 110. The depicted mounting hole layouts allow for a total of three different vertical positions of bearing housing 120 with respect to pile cap bracket 110. It should be noted that while the depicted embodiments all show pile cap bracket 110 having a larger interval 204 than interval 202 of bearing housing 120, bearing housing 120 could also include mounting holes 122 arranged at a larger interval than mounting holes 114. It should also be noted that while each depiction shows bearing housing being aligned with mounting holes defined by pile cap bracket 110, bearing housing could also be aligned with openings defined by support pile 102 in embodiments without a pile cap bracket.

FIGS. 3A-3F, show how mounting holes defined by pile cap bracket 110 can align with mounting holes defined by support pile 102. In particular, FIG. 3A shows how interval 302 between openings defined by support pile 102 are substantially larger than interval 304 between openings defined by pile cap bracket 110. FIGS. 3A-3F show a number of different positions at which pile cap bracket 110 can be attached to support pile 102. In each of the depicted positions only one of the openings is aligned; however, it should be appreciated that an opposite side of pile cap bracket 110 and support pile 102 can include mounting holes configured to receive another fastener. While only six positions are shown, it should be appreciated that a total of eight positions can be achieved with the depicted mounting hole configuration. Furthermore, in some embodiments, pile cap bracket 110 can be shifted laterally away from support pile 102 by being aligned with only one row of openings defined by support pile 102.

Figure 4A:
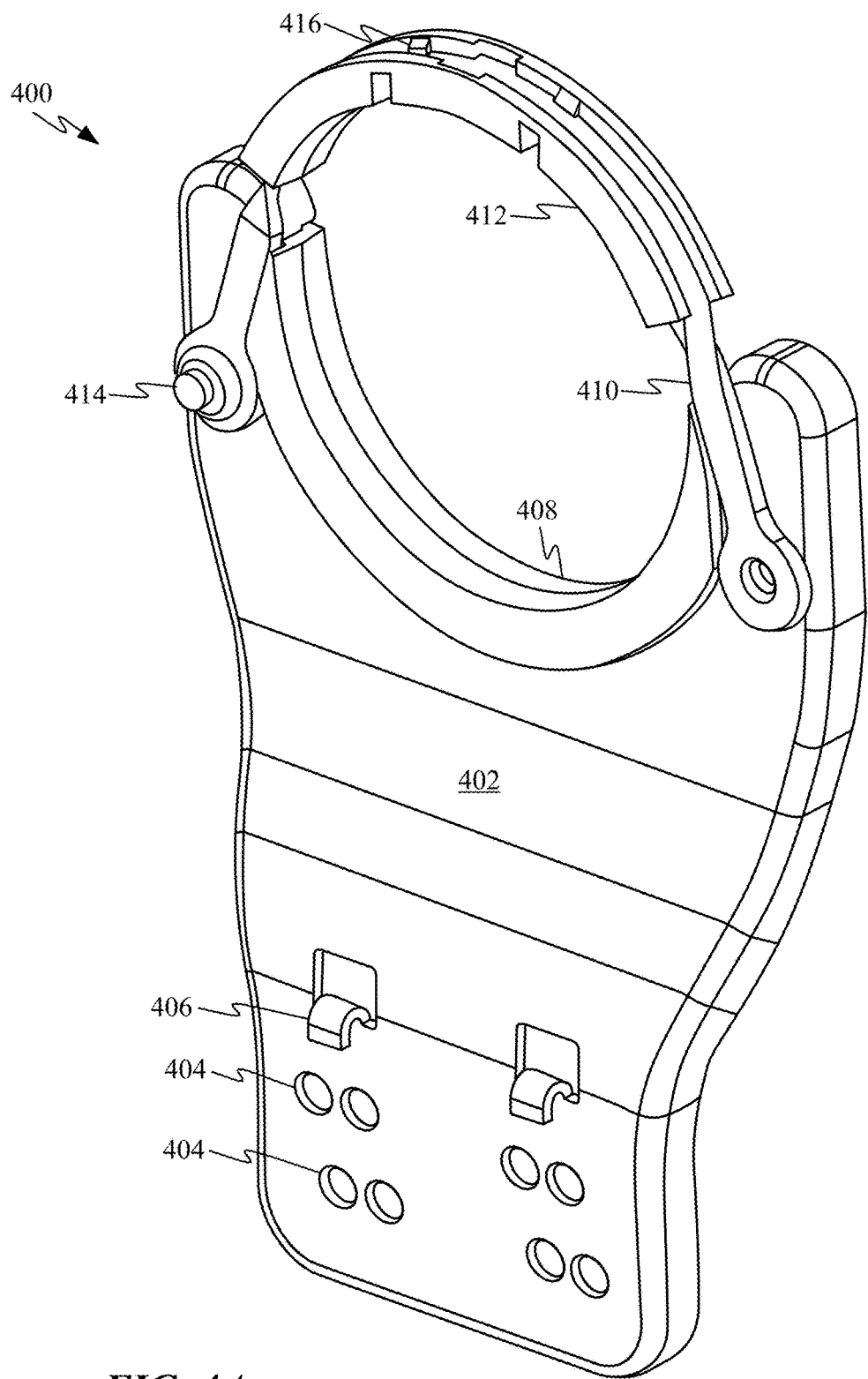
FIG. 4A shows a low profile pile cap assembly, which includes a bearing housing that is configured to mate directly with a top portion of a support pile according to embodiments of the invention.

FIG. 4A shows low profile pile cap assembly 400, which includes bearing housing 402 that is configured to mate directly with a top portion of a support pile (not shown). In some embodiments, bearing housing 402 can be manufactured from relatively simple and inexpensive material such as stamped sheet metal. Alternatively, it may be forged or even milled. As shown, bearing housing 402 includes mounting holes 404 for coupling bearing housing 402 with the support pile at different lateral positions. In addition, bearing housing 402 includes retaining hooks 406 that allow bearing housing 402 to rest on and be supported by the support pile prior to being mechanically attached to the support pile with rivets or other fasteners. Retaining hooks 406 can be configured to vertically align mounting holes 404 with mounting holes defined by the support pile when retaining hooks 406 of bearing housing 402 rest on the support pile. When retaining hooks 406 engage the edge of the support pile, the smooth edge and aligned retaining hook surfaces allow bearing housing 402 to slide laterally along the edge of the support pile to achieve the proper lateral orientation with respect to adjacent bearing housings while being able to support the weight of the torque tube. In this way, the pile cap assembly need not be fastened to the support pile until it is clear the pile cap assembly is well aligned with the torque tube. In some cases, it can be desirable to wait to fasten any of the pile cap assemblies to their respective support piles until after hooks of all the pile cap assemblies are temporarily in position. This allows an installer to confirm the lack of lateral pressure on the torque tube prior to going through the more time intensive process of installing the fasteners. As shown, one face of bearing housing 402 is mated with the support pile. It should be appreciated that bearing housing 402 can also curve around one or more additional faces as with pile cap bracket 110, depicted in FIGS. 1B-1D. Such modifications are within the spirit and scope of the invention.

Bearing housing 402 also includes a cradle portion that supports lower bearing 408. In various embodiments, lower bearing 408 may be made of plastic or other suitable strong, corrosion resistant, low friction material. Also, bearing housing 402 may have an attached metal strap 410 that supports upper bearing 412. Metal strap 410 can be positioned within a channel defined by upper bearing 412 by twisting metal strap 410 about a quarter turn so it aligns with the channel. Retention features 416 built into upper bearing 412 can be configured to prevent upper bearing 412 from becoming dislodged from metal strap 410. Upper bearing 412 can have a thickness slightly greater than the thickness of metal strap 410. In this way upper bearing 412 does not add significantly to a height of pile cap assembly 400. In some embodiments, bearing housing 402 can come preassembled with strap 410 and upper bearing 412 already secured at one end to an upper portion of bearing housing 402 by rivet 414 as shown in FIG. 4A. Alternatively, both ends may be riveted in the field at the installation site after the torque tube is lowered down onto lower bearing 408. Also, though not shown, metal strap 410 may include a turnbuckle or other device to allow the length of metal strap 410 to be adjusted, before or after riveting, to insure that upper bearing 412 fits snuggly against the torque tube. In some embodiments, it can be desirable to leave a gap of a couple of millimeters between upper bearing 412 and a top portion of the torque tube. In this way, the generation of friction between upper bearing 412 and the torque tube can be substantially reduced or even eliminated during rotation of the torque tube within the bearing defined by lower and upper bearings 408 and 412.

Figure 4B:
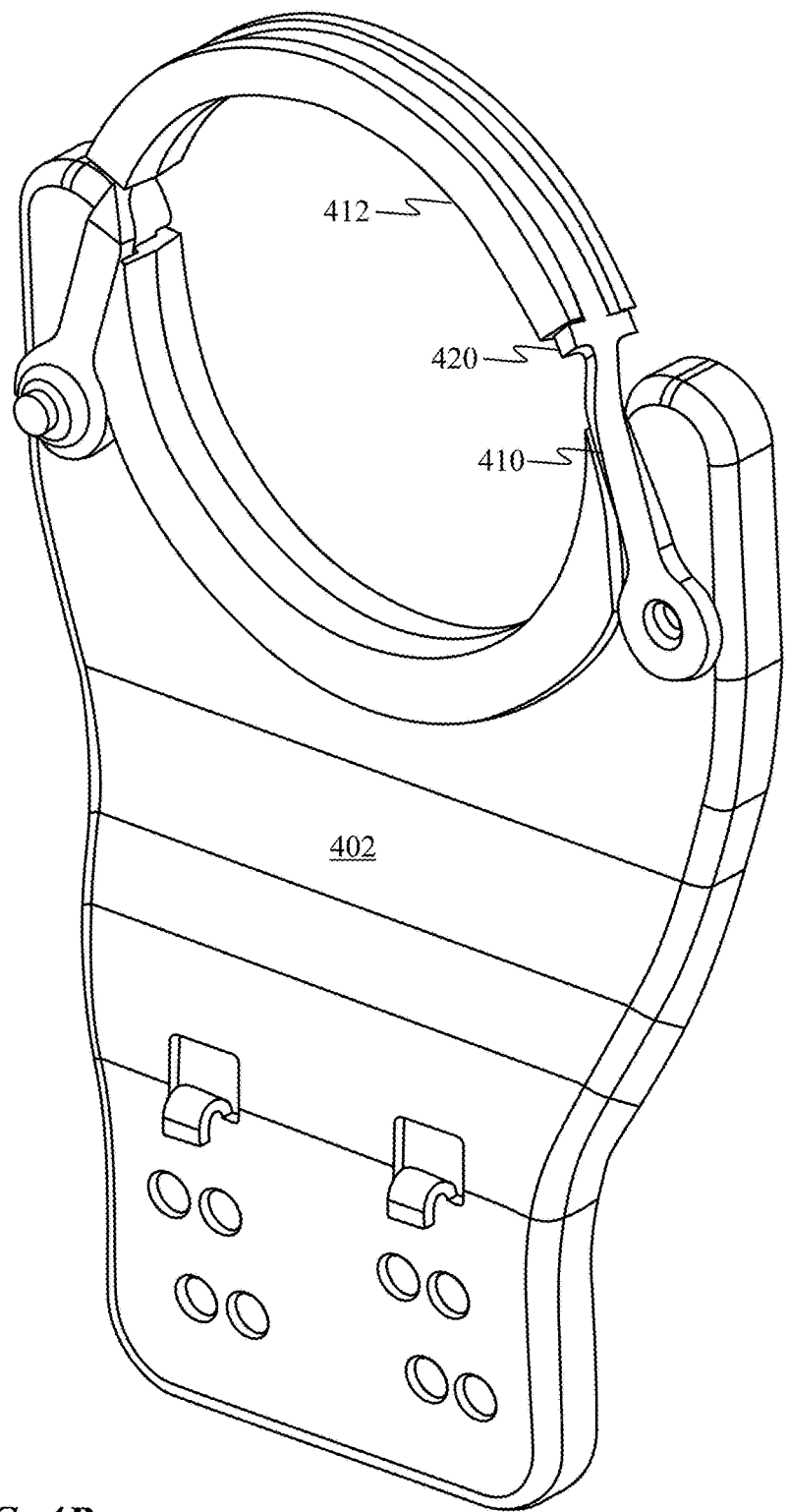
FIG. 4B depicts an alternative metal strap design in which the metal strap includes support features positioned at either end of the upper bearing according to embodiments of the invention.

FIG. 4B depicts an alternative metal strap design in which metal strap 410 includes support features 420 positioned at either end of upper bearing 412. When support features 420 are built into metal strap 410, upper bearing 412 can use a simpler design. In particular, the retention features for metal strap 410 can be removed since support features 420 keep upper bearing 412 in place by supporting each end of upper bearing 412. Because the retention features no longer need to be built into upper bearing 412, upper bearing 412 can have an overall lower profile. In some embodiments, the channel can be shaped to have a depth that a top surface of metal strap 410 is substantially coplanar with a top surface of upper bearing 412.

Figure 4C:
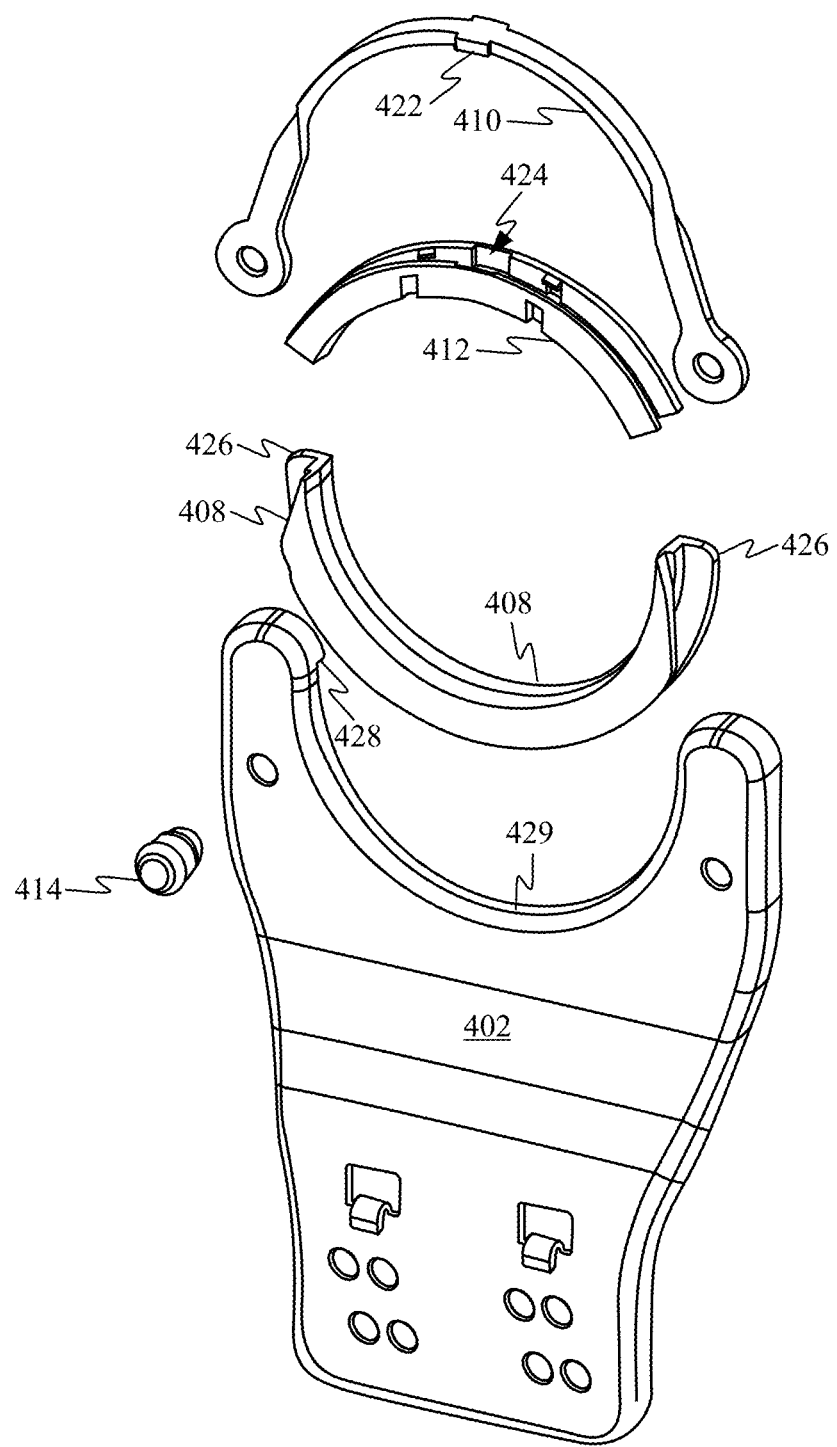
FIG. 4C shows an exploded view of the low profile pile cap assembly depicted in FIG. 4A.

FIG. 4C shows an exploded view of low profile pile cap assembly 400. In particular, metal strap 410 is shown separated from pile cap assembly 400 to clearly show the shape of anti-rotation feature 422, which interacts with notches 424 defined by upper bearing 412 to prevent inadvertent rotation of upper bearing 412 during movement of a torque tube. Anti-rotation feature 422 takes the form of a thicker central region of metal tab 422 that engages walls defining notches 424 during rotation of the torque tube. Lower bearing 408 also includes an anti-rotation feature. Distal ends 426 of lower bearing 408 interact with notches 428 defined by bearing housing 402. In this way lower bearing 408 can also be prevented from binding and moving with the torque tube. In some embodiments, lower bearing 408 also includes a protrusion within the channel defined by lower bearing 408. The protrusion can be configured to engage a small notch 429 defined by a cradle portion of bearing housing 402. Interaction between the protrusion and notch 429 can also help to discourage rotation of lower bearing 408.

Figure 4D:
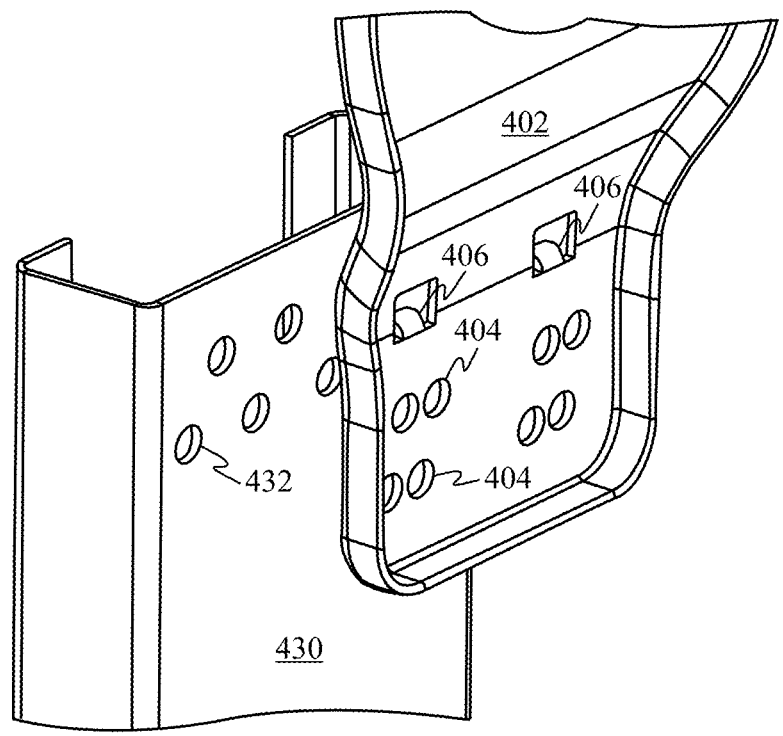
FIGS. 4D-4E show how retaining hooks of a bearing housing can engage a support pile in embodiments of the invention.
Figure 4E:
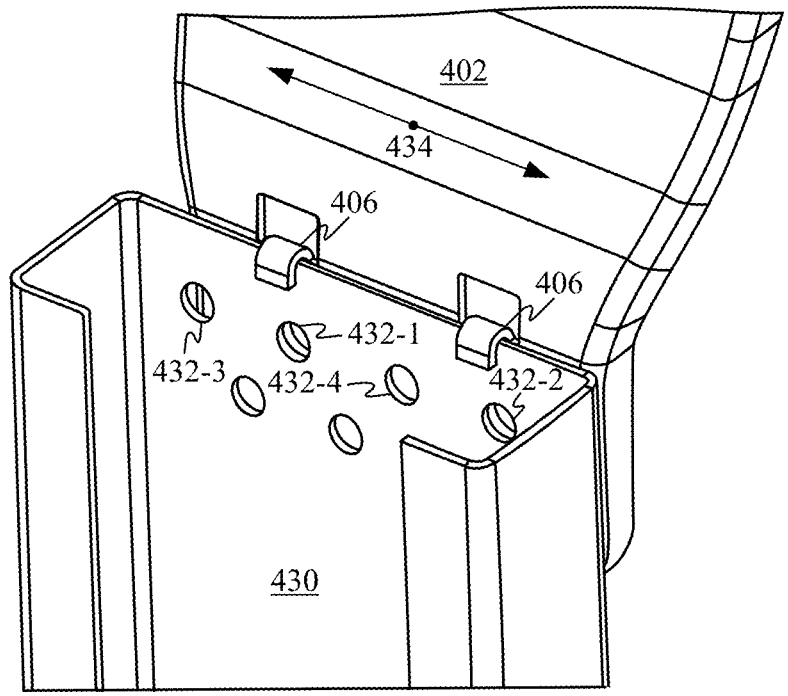

FIGS. 4D-4E show how retaining hooks 406 can engage support pile 430. In particular, FIG. 4D shows bearing housing 402 separated from support pile 430 so that the pitch difference between mounting holes 404 and mounting holes 432 can be clearly seen. FIG. 4D also shows a rear portion of retaining hooks 406 and how they curve towards support pile 430. FIG. 4E shows retaining hooks 406 engaged with a top edge of support pile 430. Arrow 434 illustrates the directions bearing housing 402 can slide along support pile 430. As depicted, bearing housing 402 is positioned in a location that aligns mounting holes 404 with mounting holes 432-1 and 432-2 of support pile 430. Bearing housing 402 can slide laterally along the top edge of support pile 430 to align mounting holes 404 with mounting holes 432-3 and 432-4. Once a desired position is achieved, fasteners can be used to engage the aligned mounting holes. In addition to aligning the components for receiving the fasteners, retaining hooks 406 can also help to reduce sheering forces applied to the fasteners. Further, in the event of a failure of one of the fasteners, retaining hooks 406 could prevent bearing housing 402 from becoming dislodged from support pile 430.

Figure 5A:
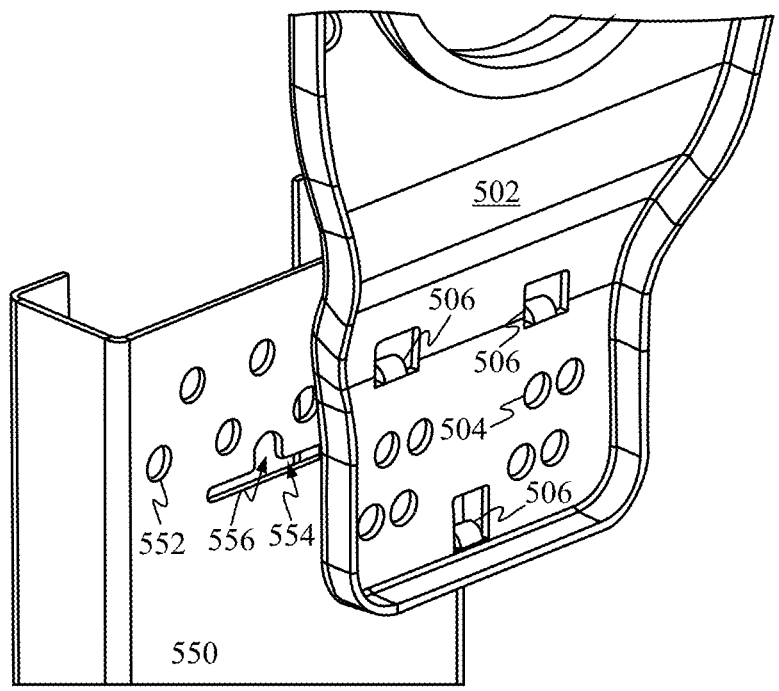
FIGS. 5A-5B show an alternative embodiment similar to the one shown in FIGS. 4A-4E with the addition of a slot for further stabilizing the coupling between the bearing housing and the support pile.
Figure 5B:
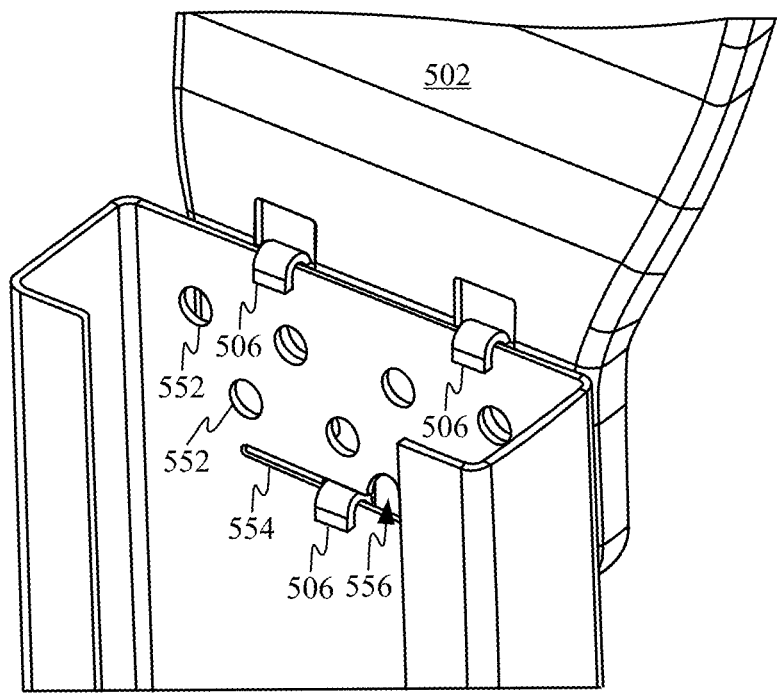

FIGS. 5A-5B show an alternative embodiment similar to the one shown in FIGS. 4A-4E. As depicted in FIG. 5A, bearing housing 502 includes a similar pattern of mounting holes 504 and three retaining hooks 506. Retaining hooks 506 can protrude in any direction, either as depicted or in the opposite direction when the opposite surface is shaped to conform with support pile 550. Lower retaining hook 506 is added to provide additional support to bearing housing 502 during attachment of bearing housing 502 to support pile 550. Support pile 550 includes mounting holes 552 and slot 554. Slot 554 is configured to receive lower retaining hook 506 through a notched portion 556 of slot 554. Once lower retaining hook 506 of bearing housing 502 is engaged within slot 554 it can slide laterally within slot 554. In some embodiments, a width of slot 554 can be constrained to limit lateral movement of bearing housing 502 with respect to support pile 550. FIG. 5B shows lower retaining hook 506 engaged within slot 554 and laterally displaced away from notched portion 556. This configuration has the benefit of providing additional stability for the connection between support pile 550 and bearing housing 502 prior to coupling the components together with fasteners. For example, the lower retaining hook 506 can oppose a lower portion of bearing housing rotating away from support pile 550.

FIG. 6A shows another pile cap assembly 600 attached to support pile 650. Pile cap assembly 600 includes lower bearing 602. In various embodiments, lower bearing 602 is formed from a polymeric material. Lower bearing 602 defines more than half of a circular bearing configured to receive a torque tube. For this reason, protruding arms 604 of lower bearing 602 can be configured to deform to temporarily increase the size of the opening to accommodate the insertion of a torque tube into the bearing. Support pile 650 includes opening 652 for receiving a strap for securing the opening defined by lower bearing 602. Lower bearing 602 includes a recess or cavity sized to receive a top portion of support pile 650. In this way, lower bearing 602 can be coupled with support pile 650 without the use of any fasteners. This can be particularly effective given that weight exerted on lower bearing 602 by a torque tube positioned within lower bearing 602 can prevent lower bearing 602 from being dislodged from support pile 650. Lower bearing 602 also defines a channel 606 that is configured to receive and guide a metal strap along lower bearing 602.

FIG. 6B shows torque tube 608 positioned within lower bearing 602. As previously discussed, protruding arms 604 can temporarily deform to accommodate the insertion of torque tube 608 into the bearing defined by lower bearing 602. FIG. 6B also shows strap 610 with retaining hook 612 at a first end of strap 610 and latch 614 at a second end of strap 610, opposite the first end. In various embodiments, strap 610 may be formed of metal. In other embodiments, strap 610 can be formed of braided wire, or other suitable flexible and durable material. Latch 614 is pivotally coupled to the second end of metal strap 610. Latch 614 can be pivotally coupled to the second end by one or more pins that define the axis of rotation of latch 614 with respect to the second end of metal strap 610. FIG. 6C shows retaining hook 612 engaged in an opening similar to opening 652. In some embodiment, retaining hook 612 can take the form of a bent end of strap 610. In one particular embodiment, the first end of strap 610 can be substantially thicker, giving retaining hook 612 more rigidity than the rest of strap 610. FIG. 6C also shows latch 614 in a position configured to engage opening 652 defined by support pile 650. FIG. 6D shows how as latch 614 engages opening 652 metal strap 610 tightens against torque tube 608 to secure torque tube 608 within the defined bearing. Protruding arms 604 can be high enough on torque tube 608 that strap 610 can be tightened without being placed in direct contact with torque tube 608. Because lower bearing 602 subtends more than half of a circle, the torque tube is effectively trapped in the bearing by gravity and lower bearing 602. As a result, strap 610 does not need to actually touch torque tube 608, thereby preventing any additional friction that would otherwise be created by an upper bearing portion.

Figure 7A:
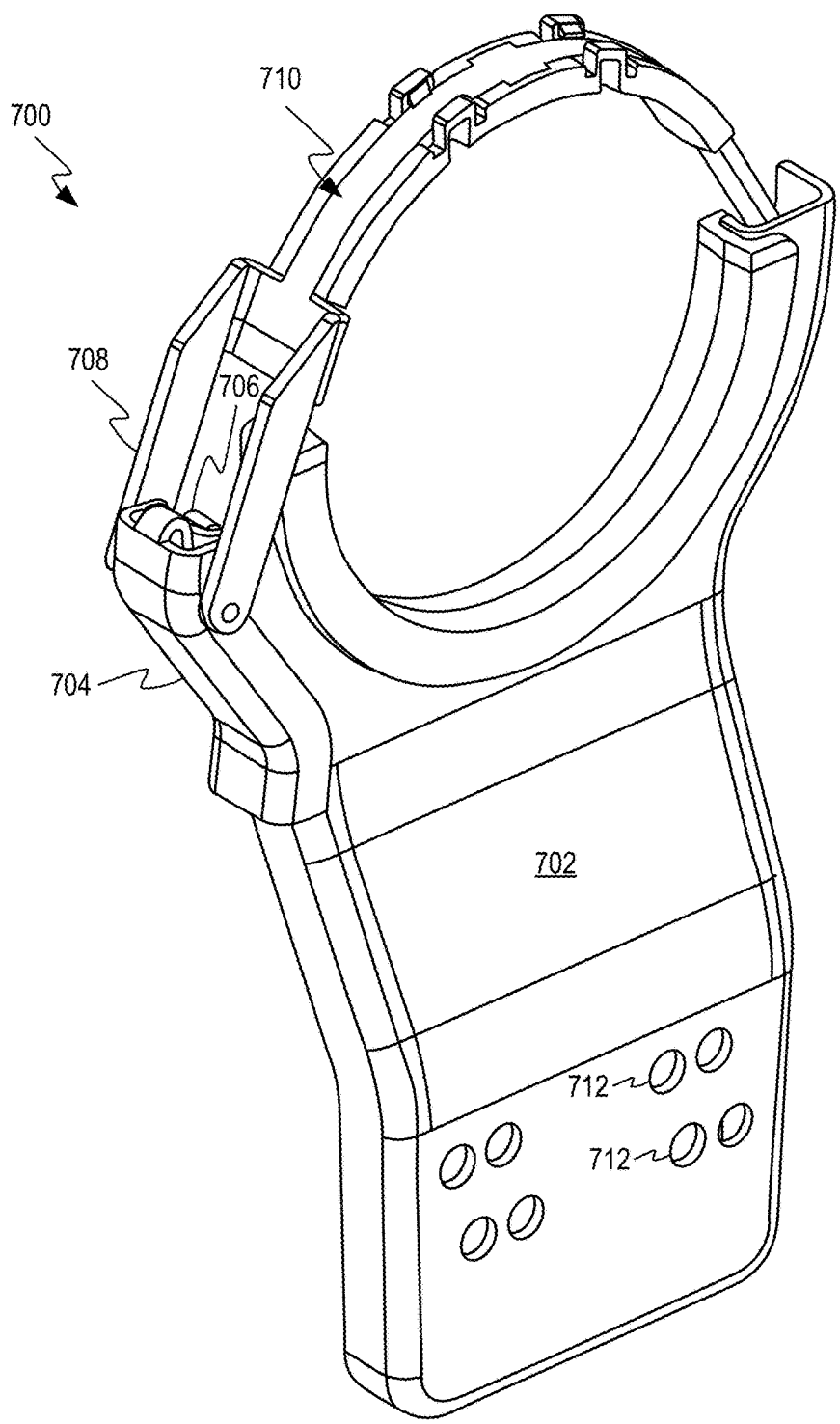
FIG. 7A shows a perspective view of another variant of a pile cap assembly.

FIG. 7A shows a perspective view of pile cap assembly 700. Pile cap assembly 700 has the advantage of being able to be secured around the torque tube without the use of any fasteners. Pile cap assembly 700 includes bearing housing 702 and latch mechanism 704. Latch mechanism 704 includes pivot tab 706 which has a curved geometry and is engaged within an opening defined by bearing housing 702. Latch mechanism 704 is pivotally coupled to two arms 708 extending from metal strap 710. Arms 708 can be pivotally coupled to latch mechanism 704 by one or more pins that define an axis of rotation between latch mechanism 704 and arms 708. In this way metal strap 710 can be secured across the opening defined by bearing housing by rotating latch mechanism 704 against bearing housing 702, thereby locking the pile cap assembly together while a torque tube positioned within the pile cap assembly remains free to rotate. Bearing housing 702 also includes mounting holes 712 for securing bearing housing 702 to a support pile.

Figure 7B:
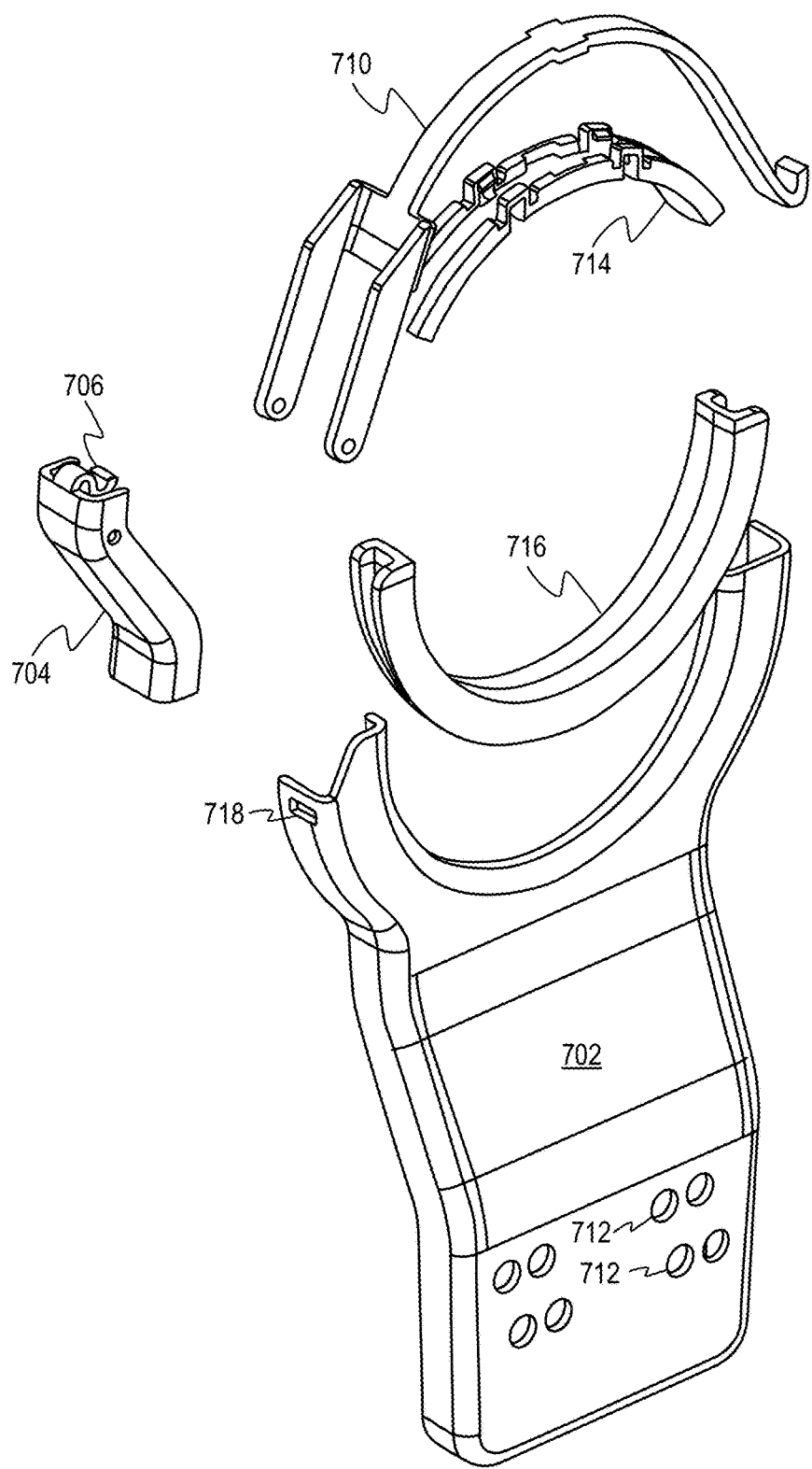
FIG. 7B shows an exploded view of the pile cap assembly shown in FIG. 7A.

FIG. 7B shows an exploded view of the pile cap assembly 700 shown in FIG. 7A. FIG. 7B more closely shows latch mechanism 704 and pivot tab 706. FIG. 7B also shows upper and lower bearings 714 and 716, respectively. FIG. 7B also shows aperture 718 defined by bearing housing 702, which is configured to receive pivot tab 706 to secure metal strap 710 to bearing housing 702. The other side of metal strap 710 includes retaining hook 720 that is also configured to engage an aperture defined by bearing housing 702 and in particular the other arm of bearing housing 702. Further, FIG. 7B shows a cut out portion of an arm of bearing housing 702 configured to accommodate the attachment of latch mechanism 704. FIG. 7B also illustrates how the geometry of that same arm is substantially similar to latch mechanism 704.

The embodiments described in conjunction with FIGS. 6A-7B have several common benefits. First, the torque tube can be inserted into the pile cap assembly without the assistance of power or even manual tools after the support piles have been driven or cemented into the ground. Next, the torque tube can be just as easily uncoupled if the torque tube needs to be repaired or replaced. Also, after the latching mechanism is pushed down to the locked position, the system is very stable. In addition, installation can be done very quickly and relatively inexpensively relative to other techniques.

Figure 8:
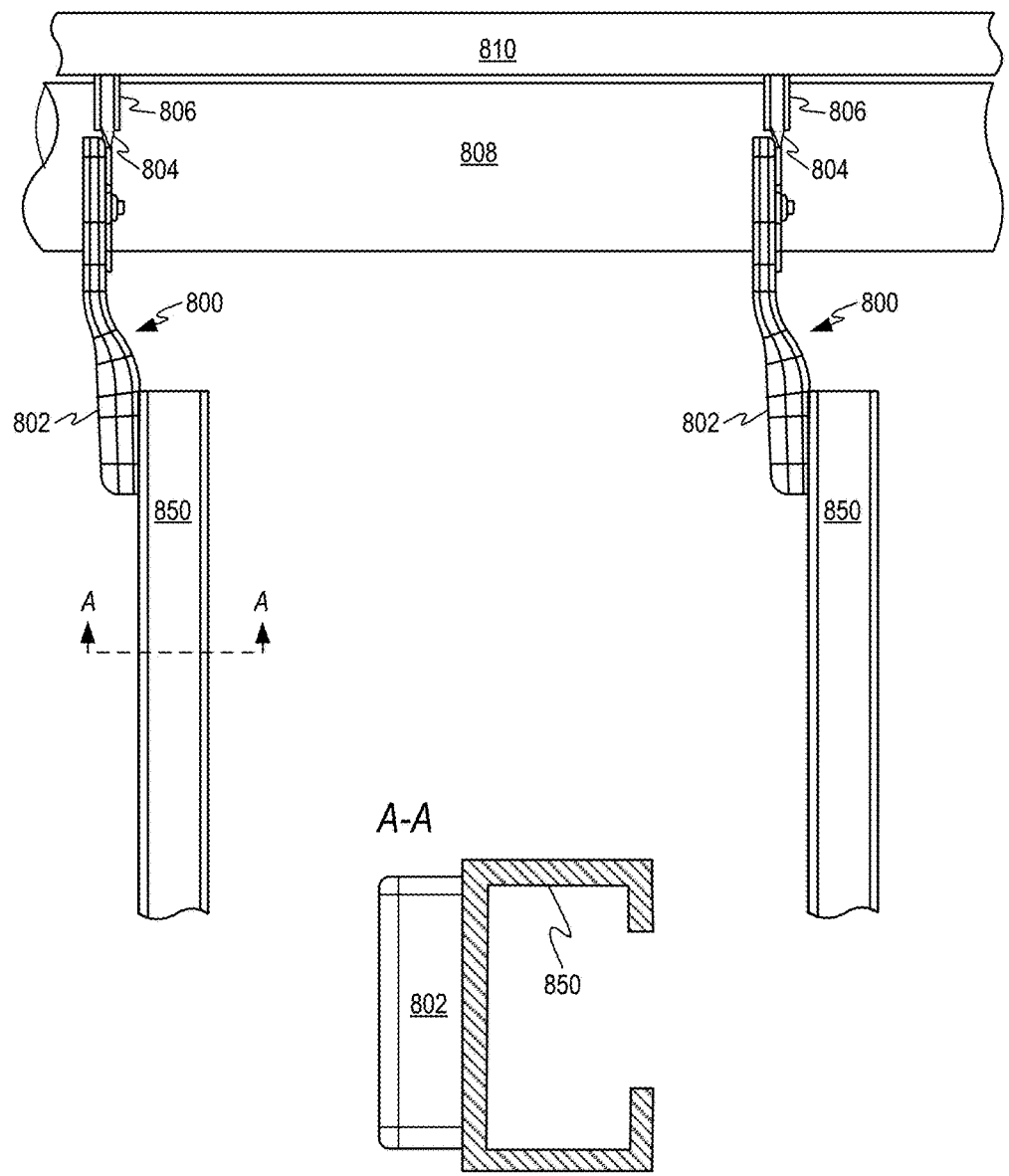
FIG. 8 shows pile cap assemblies coupled with support piles according to embodiments of the invention.

FIG. 8 shows pile cap assemblies 800 coupled with support piles 850. Bearing housings 802 are depicted coupled with metal straps 804 and upper bearing 806, which cooperate to define the bearings within which torque tube 808 is positioned. Directly above torque tube 808 is photovoltaic module 810, which is supported by torque tube 808. A gap between torque tube 808 and photovoltaic module 810 can be quite small on account of the low profile geometry of upper bearing 806. This can be advantageous as a distance between the torque tube and the photovoltaic module leaves less room for wind to pass through. The shorter distance also reduces the moment arm applied to the torque tube by wind buffeting the photovoltaic module 810. FIG. 8 also illustrates the importance of precise alignment of the bearing housing assemblies. Any minor variation in alignment could induce deflection of torque tube 808. This misalignment would also increase the generation of friction along the bearing surfaces of the bearing assemblies on account of the forces being exerted on the bearing surfaces due to the deflection of torque tube 808. FIG. 8 also shows how by coupling bearing housing 802 to one side of support pile 850 the weight of torque tube 808 is offset to one side of support pile 850 as well. The cross-sectional view depicted in accordance with section line A-A clearly shows bearing housing 802 offset to one side of support pile 850. The C-shaped cross-section of support pile 850 is optimized for supporting a load on the side of the support pile 850 bearing housing 802 is coupled to.

The various aspects, embodiments, implementations or features of the described embodiments can be used separately or in any combination. In particular, it should be appreciated that the various elements of concepts from FIGS. 1B-1D, 4A-4E, 5A-5B, 6A-6D and 7A-7B may be combined without departing from the spirit or scope of the invention.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A photovoltaic system, comprising:
   a torque tube;
   a photovoltaic module coupled to the torque tube;
   a support pile defining a first plurality of mounting holes distributed across a region of the support pile at a first interval;
   a pile cap assembly supporting the torque tube, the pile cap assembly comprising:
      a bracket portion including an integrated lateral adjustment mechanism comprising a second plurality of mounting holes distributed across the bracket portion at a second interval greater than or less than the first interval, only a subset of the second plurality of mounting holes being aligned with respective ones of the first plurality of mounting holes; and
      a fastener securing the bracket portion to the support pile, the fastener extending through one of the first plurality of mounting holes and one of the second plurality of mounting holes.

2. The photovoltaic system of claim 1, further comprising:
   a bearing portion, attached to or integrated with the bracket portion, the bearing portion subtending a portion of an arc and defining an opening accommodating at least a portion of a section of the torque tube,
   wherein the bearing portion includes a bearing housing and a lower bearing supported by the bearing housing, the bearing housing defining an anti-rotation feature that prevents rotation of the lower bearing with respect to the bearing housing.

3. The photovoltaic system of claim 2, wherein the lower bearing includes a disposable alignment feature extending across a central region of the opening dimensioned to fit the torque tube.

4. The photovoltaic system of claim 3, wherein the bracket portion defines a third plurality of mounting holes and the bearing portion defines a fourth plurality of mounting holes, wherein only a subset of the third plurality of mounting holes are aligned with the fourth plurality of mounting holes.

5. A photovoltaic system, comprising:
   a support pile defining a first plurality of mounting holes proximate a distal end of the support pile, the first plurality of mounting holes being spaced apart at a first interval;
   a torque tube;
   a photovoltaic module coupled to the torque tube;
   a pile cap assembly, comprising:
      a bearing portion defining a bearing within which a section of the torque tube is positioned, a bracket portion defining a second plurality of mounting holes spaced apart along the pile cap assembly at a second interval greater or less than the first interval, and a locking mechanism that closes the bearing around the section of the torque tube; and a fastener extending through a first mounting hole of the first plurality of mounting holes and through a second mounting hole of the second plurality of mounting holes to couple the pile cap assembly to the support pile, wherein only a subset of the first plurality of mounting holes are aligned with corresponding ones of the second plurality of mounting holes.

6. The photovoltaic system of claim 5, wherein only two mounting holes of the first plurality of mounting holes are aligned with any of the second plurality of mounting holes at any given orientation between the first and second plurality of mounting holes.

7. The photovoltaic system of claim 6, wherein the bearing portion and bracket portion of the pile cap assembly comprises a bearing housing.

8. The photovoltaic system of claim 5, wherein a shape and size of the first and second plurality of mounting holes is such that when the fastener extends through the first and second mounting holes a position of the bracket portion relative to the support pile is fixed.

9. The photovoltaic system of claim 5, wherein the support pile comprises a first wall and a second wall substantially parallel to the first wall and wherein the first plurality of mounting holes is distributed across both the first and second walls of the support pile.

10. The photovoltaic system of claim 8, wherein the bearing housing comprises a lower bearing that cooperates with the upper bearing to define the bearing.

11. The photovoltaic system of claim 5, wherein the bearing portion comprises a bearing housing that comprises a plurality of retaining hooks integrally formed with the bearing housing that engages the distal end of the support pile.

12. The photovoltaic system of claim 11, wherein the plurality of retaining hooks are configured to allow the bearing housing to slide laterally with respect to the distal end of the support pile when the fastener is removed from the first and second mounting holes while maintaining a vertical elevation of the bearing housing with respect to the support pile.

13. The photovoltaic system of claim 11, wherein the plurality of retaining hooks engage a linear edge of the support pile.

14. The photovoltaic system of claim 11, wherein the bearing housing is formed from sheet metal.

15. A photovoltaic system, comprising:

a support pile defining a first plurality of mounting holes spaced apart by a first interval;

a pile cap assembly defining a second plurality of mounting holes spaced apart by a second interval greater than or less than the first interval such that only a subset of the first plurality of mounting holes are aligned with the second plurality of mounting holes, the pile cap assembly comprising a bearing portion defining a bearing;

a plurality of fasteners coupling the support pile to the pile cap assembly by engaging two or more of the first and second plurality of mounting holes;

a torque tube extending through the bearing and being supported by the pile cap assembly; and a photovoltaic module supported by the torque tube.

16. The photovoltaic system of claim 15, wherein the first and second plurality of mounting holes are arranged linearly and the first and second plurality of mounting holes are collinear with each other.

17. The photovoltaic system of claim 16, wherein the each of the first plurality of mounting holes is separated from adjacent mounting holes by the first interval and each of the second plurality of mounting holes is separated from adjacent mounting holes by the second interval.

18. The photovoltaic system of claim 15, wherein the support pile has a C-shaped cross-sectional geometry comprising a central wall, a first wall extending from a first end of the central wall and a second wall extending from a second end of the central wall, wherein.

* * * * *